(12) United States Patent
Kumar et al.

(10) Patent No.: US 12,137,136 B2
(45) Date of Patent: **\*Nov. 5, 2024**

(54) SMART URL INTEGRATION USING SERVERLESS SERVICE

(71) Applicant: Open Text SA ULC, Halifax (CA)

(72) Inventors: Pardeep Kumar, Bangalore (IN); Mithun Karkada Sathisha, Bangalore (IN); Divisha Nikunj Varandani, Bangalore (IN); Prashantha Hanumanthappa, Bangalore (IN); Panchakshrappa Pramod, Bangalore (IN); Navaid Alam, Bangalore (IN)

(73) Assignee: OPEN TEXT SA ULC, Halifax (CA)

( * ) Notice: Subject to any disclaimer, the term of this patent is extended or adjusted under 35 U.S.C. 154(b) by 60 days.

This patent is subject to a terminal disclaimer.

(21) Appl. No.: 17/490,996

(22) Filed: Sep. 30, 2021

(65) Prior Publication Data

US 2022/0021726 A1    Jan. 20, 2022

Related U.S. Application Data

(63) Continuation of application No. 16/547,366, filed on Aug. 21, 2019, now Pat. No. 11,172,014.

(51) Int. Cl.
*H04L 67/02* (2022.01)
*G06F 16/955* (2019.01)
(Continued)

(52) U.S. Cl.
CPC .......... *H04L 67/02* (2013.01); *G06F 16/9566* (2019.01); *H04L 67/01* (2022.05);
(Continued)

(58) Field of Classification Search
CPC ... H04L 67/1097; H04L 67/42; H04L 67/141; H04L 67/02; H04L 51/22; H04L 29/08; H04L 29/00; G06F 16/9566
See application file for complete search history.

(56) References Cited

U.S. PATENT DOCUMENTS 9,826,017 B1 * 11/2017 Goldfeder ............. G06F 21/566
2006/0168221 A1 * 7/2006 Juhls ................... H04L 67/567
709/225

(Continued)

FOREIGN PATENT DOCUMENTS

WO    WO-2019043687 A2 * 3/2019 ........... G06F 16/955

*Primary Examiner* — Moustafa M Meky
*Assistant Examiner* — Kidest Mendaye
(74) *Attorney, Agent, or Firm* — Sprinkle IP Law Group

(57) ABSTRACT

A cloud-based, integrated business application suite includes an add-in that enables access from a client device to a first server, but not a second server. A user accesses the first server through an interface of the integrated suite to request a webpage which launches a first local instance of a service application. The first local instance of the service application sets up a local storage location and provides this location to a URL that is used to launch a webpage that is a client of the second server. A second local instance of the service application which is aware of the storage location is launched and this instance stores data requested from the second server in the identified local storage location. The stored information is read from the storage location by the first instance of the service application and is provided to the integrated application suite.

20 Claims, 9 Drawing Sheets

(51) Int. Cl.
*H04L 67/01* (2022.01)
*H04L 67/1097* (2022.01)
*H04L 67/141* (2022.01)
*H04L 51/42* (2022.01)

(52) U.S. Cl.
CPC ........ *H04L 67/1097* (2013.01); *H04L 67/141* (2013.01); *H04L 51/42* (2022.05)

(56) References Cited

U.S. PATENT DOCUMENTS

| | | | | |
|---|---|---|---|---|
| 2011/0277013 | A1* | 11/2011 | Chinta | G06F 21/54 |
| | | | | 726/1 |
| 2012/0059876 | A1* | 3/2012 | Chinta | G06F 21/53 |
| | | | | 709/217 |
| 2012/0278854 | A1* | 11/2012 | Ton | H04L 63/0815 |
| | | | | 726/3 |
| 2013/0145318 | A1* | 6/2013 | Hosotsubo | G06F 3/0482 |
| | | | | 715/811 |
| 2014/0344941 | A1* | 11/2014 | Sibert | G06F 21/74 |
| | | | | 726/26 |
| 2016/0034267 | A1* | 2/2016 | Wetzold | G06F 8/60 |
| | | | | 717/172 |
| 2016/0373445 | A1* | 12/2016 | Hayton | G06F 21/41 |
| 2019/0364081 | A1* | 11/2019 | Valenzuela | H04L 65/762 |
| 2020/0364323 | A1* | 11/2020 | Bendersky | G06K 19/06037 |

* cited by examiner

SMART URL INTEGRATION USING SERVERLESS SERVICE

RELATED APPLICATION(S)

This application is a continuation of, and claims a benefit of priority under 35 U.S.C. 120 of, U.S. patent application Ser. No. 16/547,366 filed Aug. 21, 2019, entitled "SMART URL INTEGRATION USING SERVERLESS SERVICE," issued as U.S. Pat. No. 11,172,014, which is hereby incorporated herein for all purposes.

TECHNICAL FIELD

This disclosure relates generally to providing access to services, and more particularly to systems and methods for enabling applications to indirectly access particular servers using instances of a local server program that that can transfer information via a storage location that is commonly accessible by the instances of the local server program.

BACKGROUND

Software application providers are increasingly providing online services that replace, or provide the same functionality as traditional software applications that were locally installed on the devices of individual users. The online services, which may be referred to as software-as-a-service (SaaS) applications are commonly provided through servers that are accessible to users on demand through the Internet. These Internet-accessible applications may be referred to as cloud-based applications. Cloud-based applications may provide a number of advantages over traditional, locally installed applications, such as eliminating problems associated with local installation, enabling providers to make additional services available as needed by users (on demand), more easily updating the applications, etc.

While many cloud-based services may be available to users, it may be difficult or confusing for users to interact with each of these applications or services individually. In some cases, application providers may consolidate multiple services or software applications into a unified or integrated solution which may be easier for users to manage. For example, a software provider may provide access through a single interface to an integrated suite of business applications that may provide the functionality of several individual applications, such as a word processor, a spreadsheet application, an email application, a slide presentation application, and so on. Such integrated applications may enable access to other applications through extensions or add-ins that integrate new functionality into the application, so that the new functionality appears to the user to be part of the same application. Because of the large number of additional applications or services that a user may wish to access through the integrated application, however, it may not be practical to construct a plug-in/add-in for each of the additional applications/functions. It would therefore be desirable to provide an alternative means to enable access to some of these applications/services.

SUMMARY

In some embodiments disclosed herein, access to additional services is enabled by launching local instances of service applications that enable communication between applications that are already installed or accessible on a client device and services that are not installed and/or directly accessible to the client device. In one embodiment, for example, a cloud-based, integrated business application suite includes an add-in that enables access from a client device to a first server (e.g., a webpage server), but does not enable direct access to a second server (e.g., a document server). A user of the client device may access the first server through an interface in the integrated business application suite. Using this interface, the user may access request a webpage from the first server, which then launches a first local instance of a service application on the client device. The first local instance of the service application sets up a local storage location and then provides this location to the integrated application suite. The integrated application suite then launches a webpage using a smart URL (which may be referred to herein as a "iURL") that contains an identifier of the storage location. This webpage is a client of the second server (the document server). This client launches a second local instance of the service application which is aware of the storage location set up by the first instance of the service application. When services requested from the second server (e.g., when documents or downloaded from the server), the results (e.g., the requested documents) are stored in the identified local storage location. The stored information is then read from the storage location by the first instance of the service application, and is provided to the integrated application suite. In this manner, the integrated application suite is able to receive information from the second server, even though it cannot directly access the second server.

One embodiment comprises a method including loading, in a web browser executing on a client device, an interface to a first server external to the client device. A first local server program instance is also launched on the client device, where the first local server program instance communicates with the interface to the first server. The first local server program instance designates a storage location on the client device to be used for temporary storage of data. The storage location may be, for example, a user-specific folder on a storage device coupled to the client device. The interface to the first server may be configured to obtain a user token for the document server, which is associated with a specific user of the client device.

Responsive to a user request to access data stored on the second server, a URL which identifies the designated storage location is used to launch a client program which is configured to access a second server external to the client device. The URL may also include the user token for the second server. A second local server program instance is launched on the client device, where the second local server program instance is configured to communicate with the client program. When the client program accesses the second server, the client program provides the requested data to the second local server program instance, which transfers the requested data to the storage location designated by the first local server program instance. The first local server program instance accesses the requested data stored in the storage location and provides the requested data to the application executing on the client device.

The first local server program instance may be launched by generating a first set of connection data comprising randomly generated data usable by the first local server program instance to verify that a connection request is from the web page, and launching the first local server program instance, providing the first set of connection data to the first local server program instance. The web page may then create a first client socket instance and send the connection request to the first local server program instance to establish a connection between the first client socket instance and a corresponding first server socket instance of the first server program instance, where the connection request comprises the randomly generated data. Based on an acceptance of the connection request by the first server program instance, the connection may be completed, where the connection is usable for bi-directional communication between the first client socket instance and the first server socket instance.

One alternative embodiment may comprise a system having a client device having a processor configured to perform a method substantially as described above. Another alternative embodiment may comprise a computer program product comprising a non-transitory computer-readable medium storing instructions executable by one or more processors to perform such a method. Numerous other embodiments may also be possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, or rearrangements may be made within the scope of the disclosure without departing from the spirit thereof, and the disclosure includes all such substitutions, modifications, additions, or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

Figure 1:
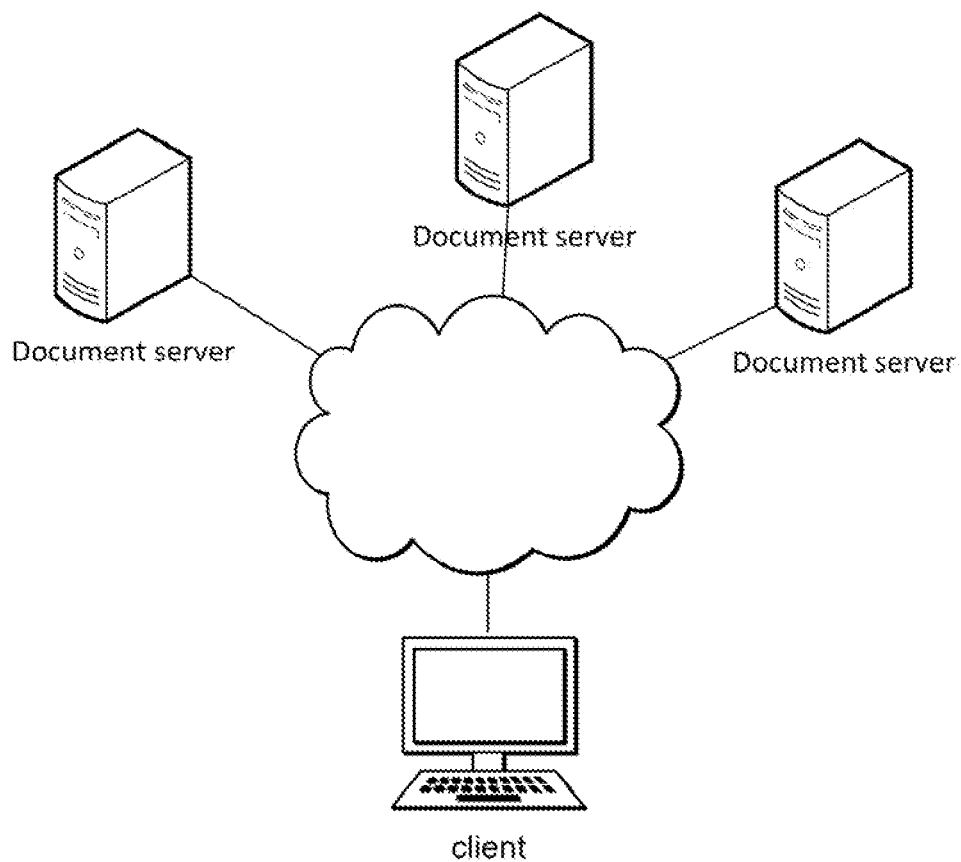
FIG. 1 is a block diagram illustrating the components of a system in which some embodiments may be implemented.

Embodiments of the present disclosure provide systems and methods for enabling access to a server that is not directly accessible by a client device by launching local instances of service applications that allow data retrieved from a server to be communicated between instances of a serverless server application via a temporary storage location. Referring to FIG. 1, a high level functional block diagram is provided to illustrate the components that are involved in some embodiments of the invention. As depicted in this figure, a client 100 is communicatively coupled through a network 110 to communicate with the number of servers. Application server 120 may be accessed by client device 100 to enable a user to access applications such as an email application, a document processing application, a spreadsheet application, and so on. Webpage server 130 is accessible by the client device to provide webpages to the client, and document server 140 is accessible to provide documents to the client.

Application server 120 provides a number of different applications as an integrated solution. Add-ins may be provided to allow the client to access various other services through this integrated solution. For example, in this embodiment, an add-in for webpage server 130 is provided, so that client 100 can access the webpage server through the integrated solution provided by application server 120. It may not be possible or practical to provide add-ins for each server that client 100 may wish to access, so the client may have access to some servers, but not others through add-ins to the integrated solution of application server 120. For instance, in one embodiment, while the integrated application solution includes an add-in to webpage server 130, it does not include an add-in to document server 140. The client may, however, nevertheless wish to access documents stored on document server 140, so it may be desirable to provide a means for the client to access these documents in a way that does not require an add-in to the integrated application solution.

Figure 2:
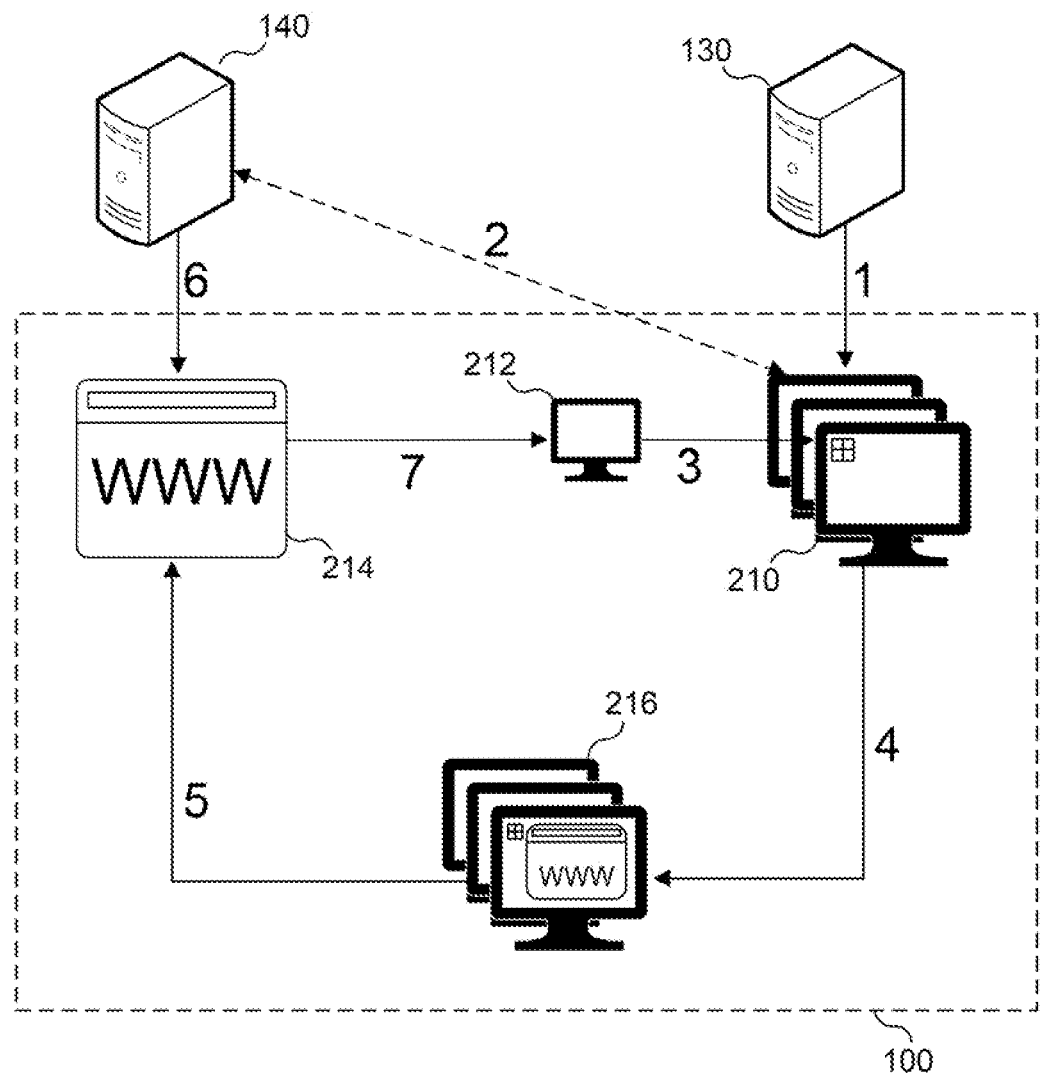
FIG. 2 is a block diagram illustrating the operative relationships between components of a system in accordance with some embodiments.

FIG. 2 is a diagram illustrating the components of the system and the operative relationships between these components. As depicted in this figure, webpage server 130 is connected to client device 100, which is executing an instance of an integrated business software solution 210 such as Microsoft office 365. Integrated business software solution 210 is provided by an application server which is not explicitly shown in the figure. A user on client device 100 can access applications that are part of integrated business software solution 210, such as a word processor, spreadsheet application, etc. via a network connection to the application server.

Webpage server 130 is accessed using an add-in to integrated business software solution 210. When the user executes an instance of integrated business software solution 210, an interface to webpage server 130 is loaded with the integrated software solution. Thus, webpage server 130 is a visible within integrated business software solution 210, so a user can access webpage server 130 as an integrated tool or function that is enabled through the integrated software solution, rather than having to access the webpage server through a separately executing application. In this embodiment, when the add-in to access webpage server 130 is loaded, an interface is also provided to make a backend REST (representational state transfer) connection to document server 140. The interface does not access document server 140 as an application, but is instead used as a backend connection to authenticate the user.

When the webpage server add-in is loaded in integrated business software solution 210, a local service 212 is launched on client device 100. The local service comprises an instance of a service application that is running locally on the client device, and may therefore be referred to as a "serverless" service or server. The details of this local service are available to the webpage server add-in within integrated business software solution 210, but the serverless service is not publicly available.

When the user of integrated business software solution 210 wants to access document server 140, the access must be made through a client application of the document server, since the document server is an independent product and the integrated software solution does not have an add-in for the document server. When the user wishes to access the document server, the client application 214 for the document server is launched in a browser window 216 using an "intelligent" URL, or iURL. The intelligent URL is programmatically invoked within the add-in for the webpage server in the integrated business software solution. When the intelligent URL is invoked, information is provided from the instance of the serverless service that is executing locally on the client device. Thus, as accessed using the intelligent URL, the client application for the document server has details from this serverless service. The intelligent URL also includes a credential token that was acquired for the user when the webpage server add-in made the backend connection to the document server to authenticate the user. The user can then, from integrated software solution 210, interact with document server 140 directly through the client application.

The intelligent URL (iURL) can pre-configured to designate a specific page or screen that the user wishes to access within a website. By comparison, a typical URL does not specify a particular page, and normally takes the user to the home page for the website, or to a login page. The iURL can be used to access a specific page to perform a specific operation without having to go through a login page, homepage, or other screens that the user does not need to access. As noted above, in some embodiments a user authentication token can be obtained from the second server, and this token can be provided in the iURL so that the client application that is launched using the iURL can access the server and obtain the desired service (e.g., documents) from the server without having to login or otherwise obtain credentials for the server.

When the user has completed the desired operations to access document server 140 through the client application, the client application makes a call back to the serverless service that is running locally on the client device and provides various information to this service, such as communication status or information responsive to the access to the document server. The client application for the document server may then be closed after this information has been communicated back to the serverless service. Because the locally running serverless service has a dedicated connection to the server 130 and the associated add-in to integrated software solution 210, the information returned by the client application, including the data provided by document server 140, is available to the user through the integrated software solution.

It can be seen from the figure that most of this activity is on the client side. More specifically, when the user wishes to access document server 140, the webpage server interface, which is an add-in to the integrated software solution, launches the client application for the document server using the intelligent URL that includes information provided by the local serverless server, and information from the client application is communicated via the serverless server back to the webpage server interface, so that it is accessible to the user. The only activity that is not on the client side occurs when the webpage server interface is initially loaded, when the document server is contacted to authenticate the user, and when the client application accesses the document server.

Figure 3:
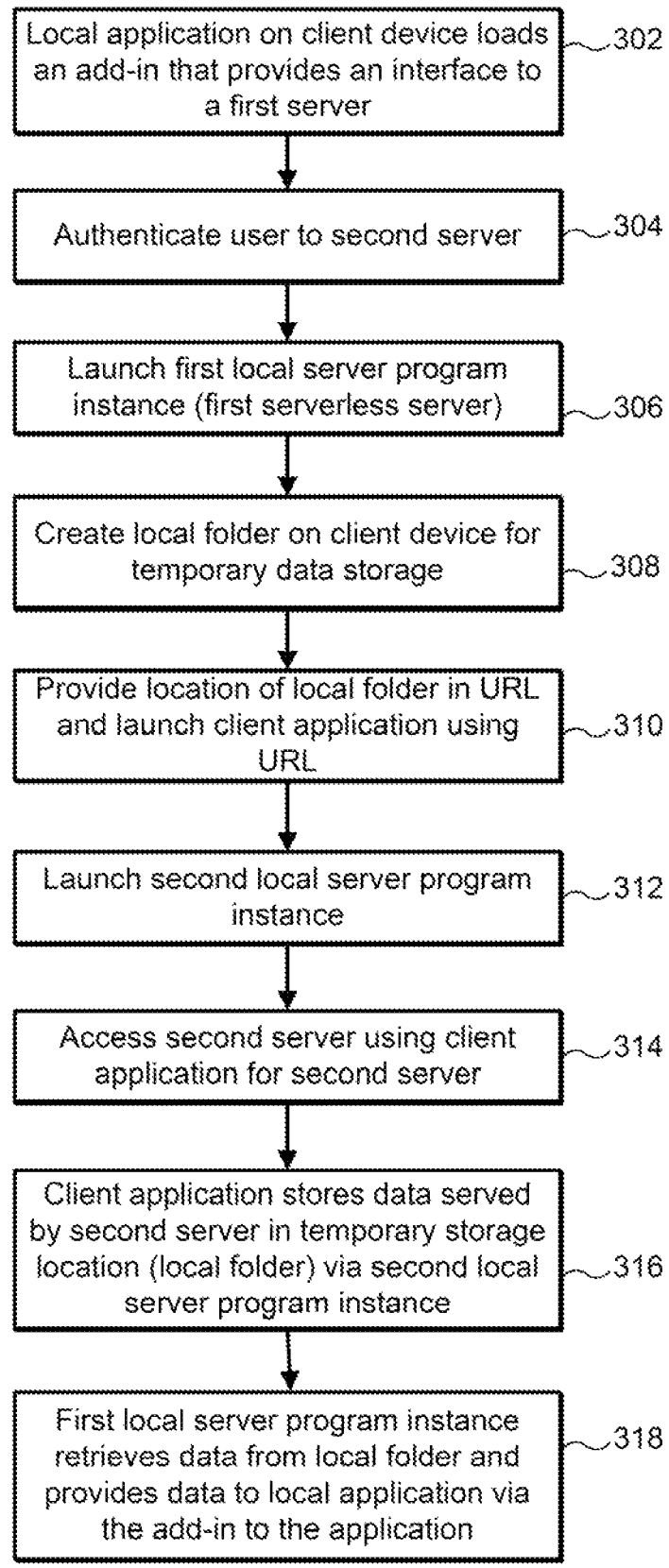
FIG. 3 is a flow diagram illustrating a method for accessing a second server through an interface to a first server in accordance with some embodiments.

Referring to FIG. 3, a flow diagram illustrating a method for accessing a second server through an interface to a first server in accordance with some embodiments is shown. In this method, a local application which is running on a client device loads an add-in that provides an interface to a first server (302). The add-in provides direct access to the first server, but not to the second server. The application does not have a similar add-in that allows direct access to the second server.

When the add-in is loaded into the application, the add-in makes a backend connection to the second server and authenticates the user of the application to the second server (304). The second server provides the add-in with a user authentication token. A first instance of a local server application is also launched when the add-in is loaded (306). This instance of the server application (a first serverless server) is local to the client device and is accessible by the user of the application on the client device, but is not publicly accessible.

The first serverless server instance configures a temporary storage location on the client device (308). The storage location may be, for example, a folder that is created under the name of the user who is using the application, and who has been authenticated to the second server. The first serverless server instance may also create a cache within the folder to track items that are copied into and out of the storage folder.

The first serverless server instance provides an identifier of the temporary storage location to the add-in, which includes this information in an intelligent URL which is then used to launch a client application for the second server (310). The client application runs on the client device and can directly access the second server. A second serverless server instance is also launched on the client device (312). The second serverless server instance is in direct communication with the client application. The second serverless server instance is also aware of the temporary storage location set up by the first serverless server instance so that it can store items in this storage location.

The user can then use the client application to access the second server, retrieving documents or other data from the server (314). The client application provides the retrieved data to the second serverless server instance, which stores the data in the temporary storage location that was provided in the iURL (316). The first serverless server instance can then retrieve the data from the temporary storage location and provide the data via the add-in to the original application (318). The client application and the second serverless server instance may be terminated (or may automatically terminate) when the desired access to the second server has been completed.

It should be noted that the methods depicted in this disclosure are illustrative, and the disclosed subject matter is not limited to the specific ordering of or numbers of steps illustrated. Embodiments may implement additional steps or alternative steps, omit steps, or repeat steps.

Figure 4:
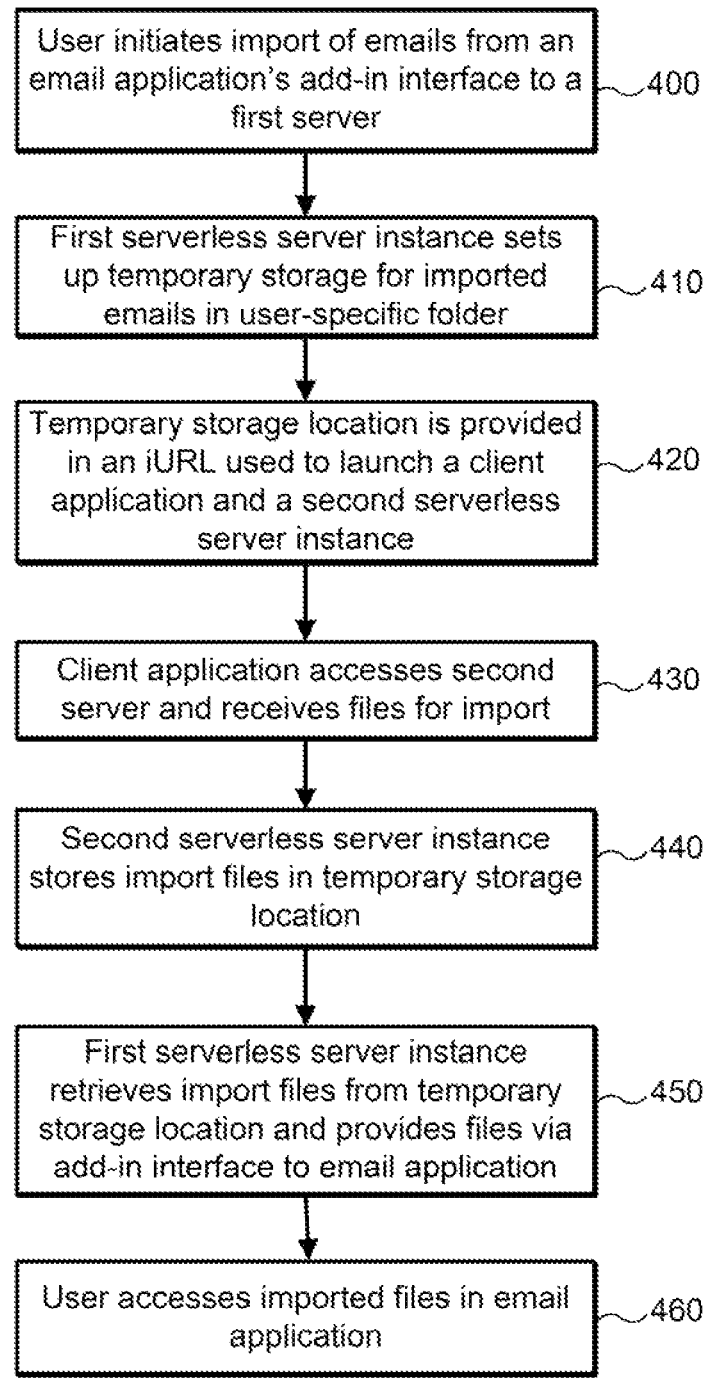
FIG. 4 is a flow diagram illustrating an example of the operation of the system in accordance with some embodiments.

Referring to FIG. 4, a flow diagram illustrating an example of the operation of the system in accordance with some embodiments is shown. This example illustrates a scenario in which the user wishes to import files to an email application.

In this example, the user is running an instance of an integrated business software solution on a client device. The integrated software solution includes an email application, and also includes an add-in for an interface that is configured to directly access a first server (e.g., a webpage server). In the email application, the user accesses the add-in interface and selects an import action to retrieve files associated with the user's emails (400). When this action is initiated by the interface, a first serverless server which is running locally on the client device sets up a storage location on the client device (410) which will be used to temporarily store the imported files. In this example, the storage location is a user-specific folder in a memory of the client device.

The storage location is provided by the first serverless server to an intelligent URL which is used to launch a client application for a second server, which in this example is a document server containing the files that the user wishes to retrieve (420). When the client application is launched, a second serverless server is also launched on the client device. The user then accesses the second server through the associated client application, retrieving the files desired by the user (430). The second serverless server then stores the retrieved files in the storage location that was set up by the first serverless server (440). After the files have been retrieved and stored in the storage location, the client application and second serverless server may be terminated. The first serverless server then retrieves the files from the storage location and provides them via the add-in interface to the email application (450). After the files have been successfully transferred to the email application, the files in the storage location set up by the first serverless server may be deleted. The files are then available to the user in the email application and other applications in the integrated software solution (460).

The system thereby enables access from the integrated software solution to the second server without having to make an external call to the server.

Figure 5A:
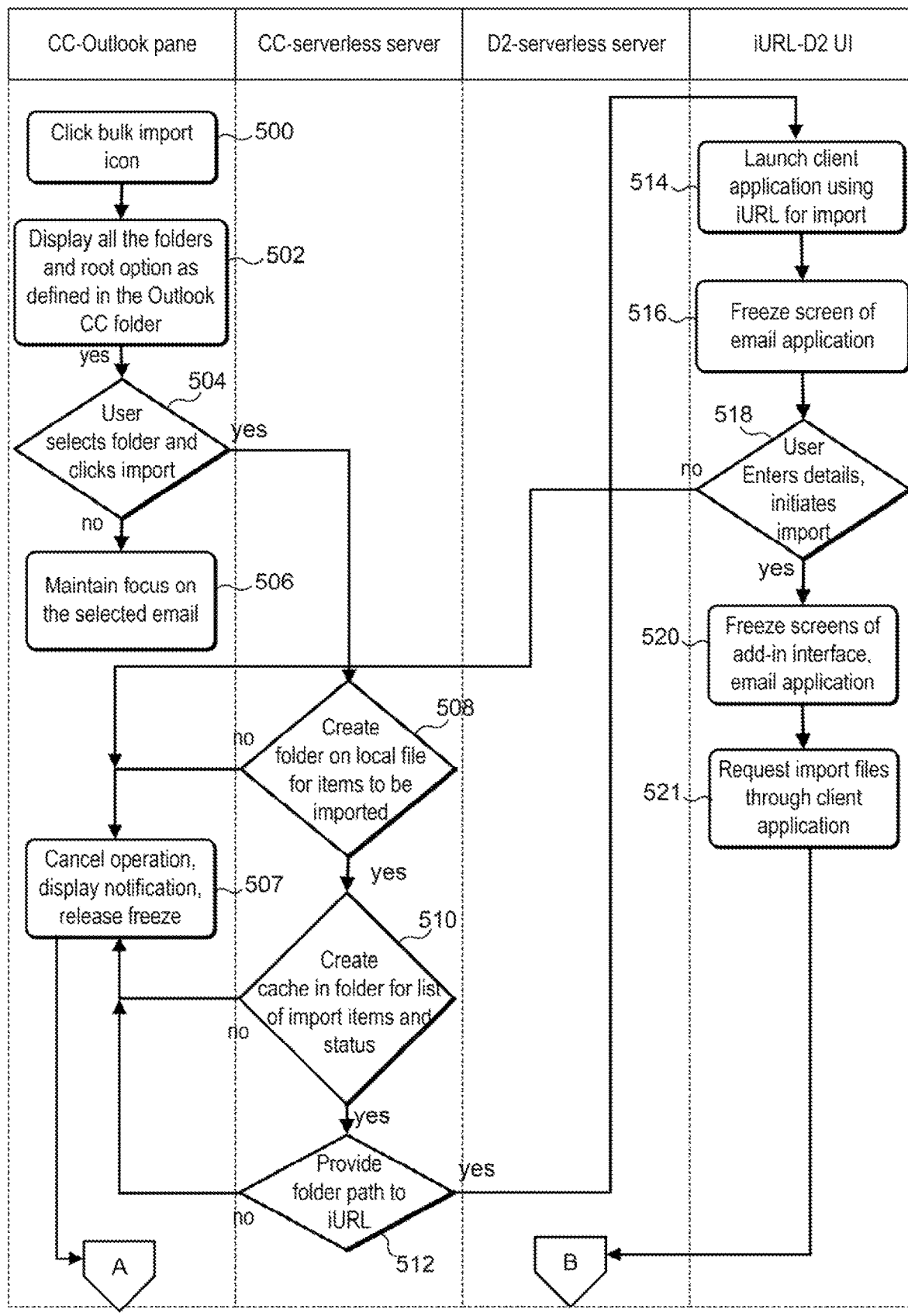
FIGS. 5A and 5B are more detailed flow diagrams illustrating the example of FIG. 4 in connection with several of the components of the client device in accordance with some embodiments.
Figure 5B:
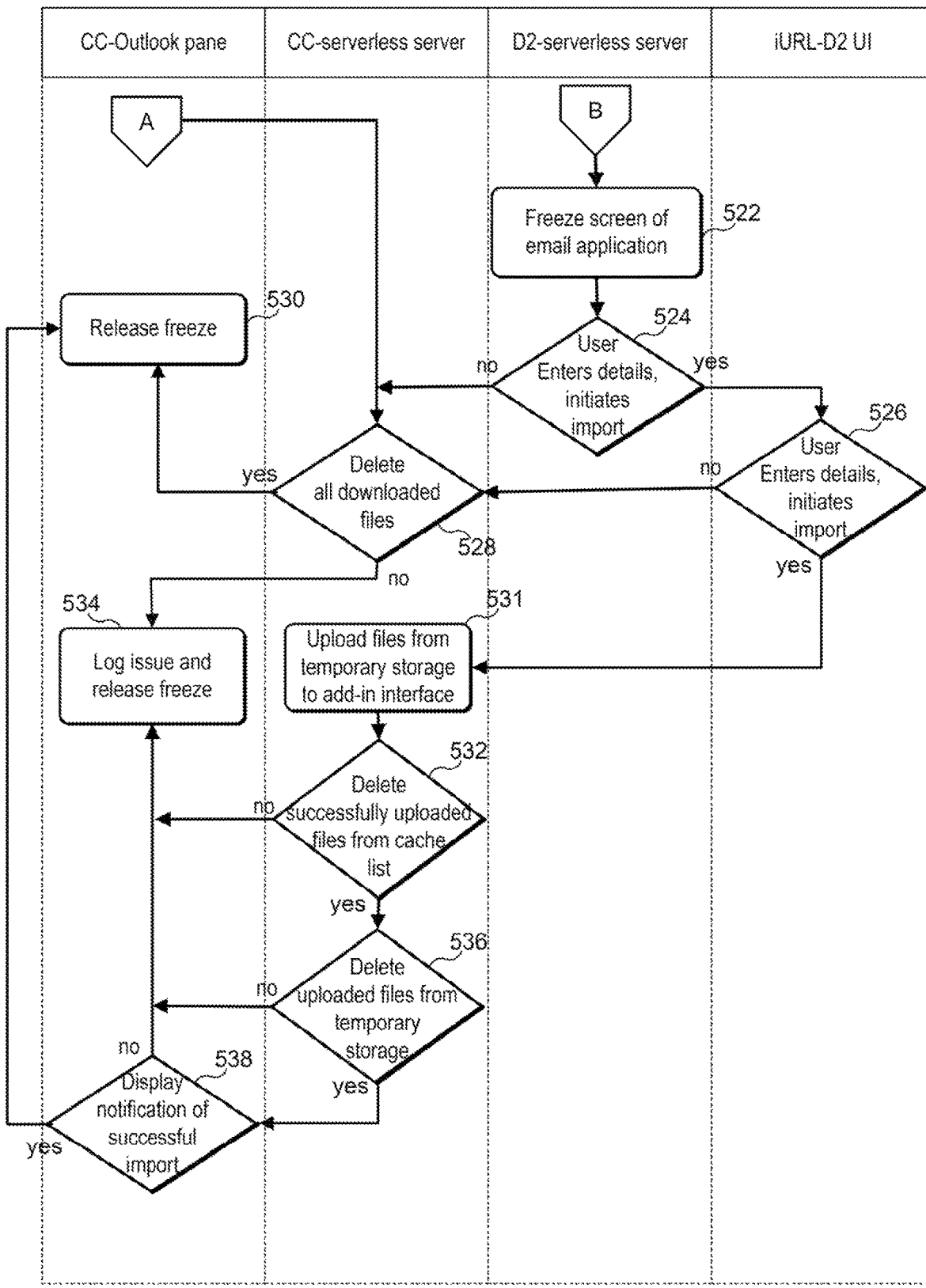

Referring to FIG. 5, a flow diagram illustrating this example in more detail is shown. In this figure, the actions of the flow diagram are segregated into columns which show the components of the system by which the respective actions are performed. The columns in the figure are associated with, from left to right, an add-in interface for a first server, a first serverless server instance, a second serverless server instance, and a client application for a second server.

As noted above, this example depicts a scenario in which an email application of an integrated business software solution is running on a client device of a user. The integrated business software solution incorporates a set of business applications including an email application. An add-in for a first server has been loaded so that the user can directly access the first server through the email application. The add-in is integrated with the email application so that the add-in is essentially indistinguishable from the email application from the perspective of the user. The first serverless server instance in this example was launched when the add-in to access the first server was loaded.

While using the email application, a pane for add-in interface to the first server is displayed by the email application. The pane may, for example, be displayed in response to a right-click on a link or icon corresponding to the first server. While viewing emails in the email application, the user accesses the add-in interface pane and selects an import action that is displayed in the pane (500). In this example, the action involves a bulk import of files from the second server to the add-in and the integrated software solution. In response to selection of the import action, the add-in displays the folders of files that are available to be imported, as defined by the email application (502). If the user does not select one of the displayed folders and/or files to be imported, a focus is maintained on a currently selected email in the email application (504, 506).

After the user selects one of the folders and/or files and confirms that the folders/files are to be imported (e.g., by clicking on a corresponding link or icon), the interface of the email application itself may be frozen for the pendency of the import operation. In response to the user initiating the import operation, the first serverless server instance creates a folder which is specific to the user, and which will serve as a temporary storage location for the folders/files to be imported (504, 508). In one embodiment, the folder for the temporary storage location will be given the same name as the folder that is selected for import. The first serverless server instance also creates a cache within the folder of the temporary storage location and stores in the cache a list of the items that have been selected to be imported (510). the first serverless server instance then provides the location for the temporary storage of the imported items (the created folder) in an iURL (512). At any of these steps, the user may choose not to proceed with the import operation, in which case the operation is canceled, and the focus remains on the email application so that the user can simply continue to use this application.

If the user proceeds with the import operation, the iURL is used to launch an instance of the client application for the second server, which contains the items to be imported (514). A second serverless server instance is launched along with the client application. This second serverless server instance is configured to communicate with the client application, and is aware of the temporary storage location as identified in the iURL, so that it can transfer data to this location.

In this embodiment, the interface of the email application is frozen while the client application is performing the import operation (516). The user may be presented with a display pane, such as a dialog box, through which the user can enter any detailed information required for the import operation and then initiate the import operation by the client application (518). If the import operation is initiated by the client application, the email interface and the interface to the first server are both frozen (520). Alternatively, the user may elect to cancel the operation, in which case a notification of the canceled operation is provided and the freeze on the interface of the email application and/or the interface to the first server is released (507).

If the user elects to proceed with the import operation, the client application will request the desired files/folders from the second server, and will receive the requested files (521). The files received from the second server will then be uploaded by the second serverless server instance to the temporary storage location identified in the iURL (522). The second serverless server instance will also update the cache in the temporary storage location to identify the import status of each of the files/folders that is retrieved from the second server during the import operation. If the operation to retrieve the files/folders from the second server and upload these files/folders to the temporary storage location is not successful, any downloaded files are deleted from the temporary storage location by the first serverless server instance (524, 528). If the operation is successful, the second serverless server instance checks in with the client application to confirm successful completion of the operation (524, 526).

The first serverless server instance then uploads the files/folders from the temporary storage location to the add-in for the first server (531). When the files/folders have been successfully uploaded from the temporary storage location to the add-in of the integrated software solution, the cache in the temporary storage location is updated to remove these files/folders from the listing in the cache (532). The successfully uploaded files/folders are then deleted from the temporary storage location (534). the add-in then displays a notification to the user that the import operation was successfully completed (538).

If the first serverless server instance fails to successfully upload the files/folders from the temporary storage, update the listing of files/folders in the cash in the temporary storage, or delete the files/folders from the temporary storage after upload, the corresponding issue is logged by the add-in, and the interfaces which were frozen during the operation are released (534).

Figure 6:
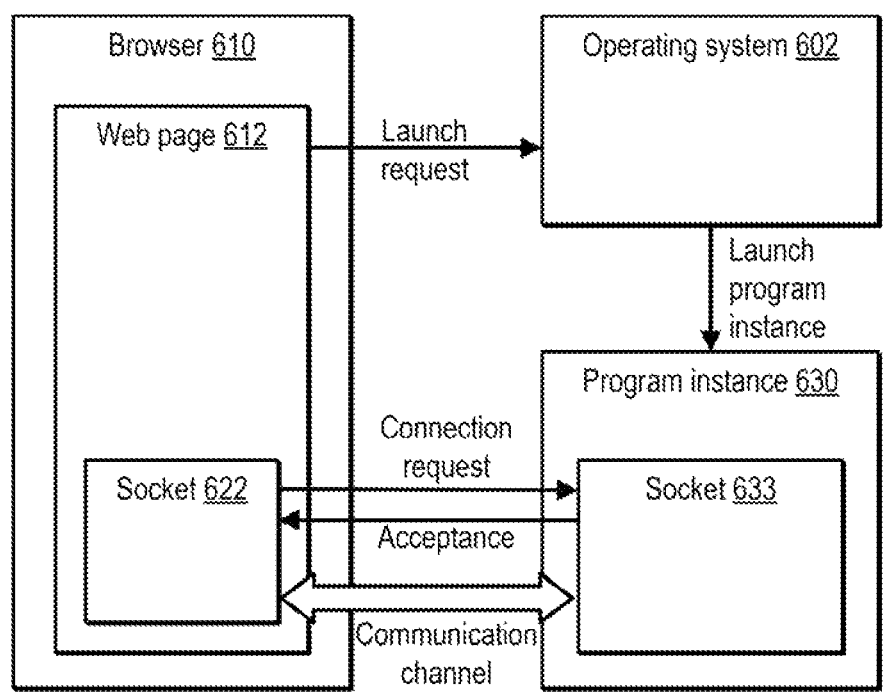
FIG. 6 is a block diagram of a computing device with extended browser functionality in accordance with some embodiments.

FIG. 6 is a block diagram of one embodiment of a computing device 600 with extended browser functionality. Computing device 600 comprises computer hardware, such as a processor, memory, input/output devices, and a network interface to connect to a network. The processor may be configured to execute computer executable instructions. For example, computing device 600 further includes an operating system 602 configured to be executed on the processor to provide various services to programs (applications) and manage or act as an intermediary between programs and the various hardware components, a web browser 610 configured to be executed on the processor, where browser 610 may be a portion of operating system 602 in some embodiments, and a server program (an instance 630 of which is illustrated) configured to be executed to provide extended functionality. According to one embodiment, server program instance 630 is a local program that executes on the same computing device 600 as browser 610. For example, browser 610 and server program instance 630 may execute on the same processor.

Browser 610 is configured to render a web page, which may include browser 610 executing on a processor to process HTML or other markup language, and related resources, such as scripts, style sheets, image files, video files, audio files or other resources, potentially retrieved from multiple network locations, that are processed by browser 610 to render the web page. The web page may comprise instructions (e.g., HTML, JavaScript or other instructions) interpretable or executable by the browser 610 to implement various functionality. Thus, web page can be said to perform various operations such as providing a user interface (UI), launching and connecting to an instance (e.g., instance 630) of the server program, communicating with the server program or other operations.

As will be appreciated by the skilled artisan, many browsers implement single threaded rendering engines, such that all (or most) rendering operations on a web page are executed in a single thread. Examples of such rendering operations typically include, but are not limited to, parsing HTML (or other markup language) into a DOM and executing scripts embedded in or referenced by the markup language. In some embodiments, at least a portion of the instructions of the web page can be configured to be interpreted or executed in another thread from the main web page thread. For example, the web page can be configured so that the connection with server program instance 630 is created or maintained by a separate thread from the main web page thread so that creating or maintaining the connection does not block processing of the markup language or other scripts, such as UI scripts, executed in the main web page thread.

As discussed above, the web page is configured to launch server program instance 630. To facilitate launching of server program instance 630, the server program can be registered in a registry of operating system 602 as a handler for a custom protocol. In one embodiment, a server program "myprogram" is registered in a registry as the handler for "myprotocol". This registration may be performed as part of installing the server program or at another time. The mechanism for registering a program to handle a protocol is operating system dependent and the server program can be registered to handle the custom protocol using the appropriate mechanism for the operating system 602. For a MICROSOFT WINDOWS operating system, for example, such registration can be recorded in a WINDOWS registry key. For instance, the following registry script is configured to register myprogram.exe to be launched when a launch request using "myprotocol" is received:

reg add HKCU\SOFTWARE\Classes\myprotocol\shelkopen\command/t REG_EXPAND_SZ/d "%LOCALAPPDATA%\Programs\myprogram\myprogram.exe\"%%1\""/f In this example, other components running on computing device 600, such as browser 610, can launch an instance of the server program (e.g., launch an instance of myprogram.exe) using a universal resource identifier (URI) such as "myprotocol:arg1". Moreover, web pages being processed by different browsers on computing device 600 can launch and connect to instances of the same installed server program.

The web page may include instructions executable by browser 610 to generate a launch request to operating system 602 to cause operating system 602 to launch instance 630 of the server program. According to one embodiment, web page 612 is configured to automatically send the launch request as browser 610 is loading the web page. In another embodiment, the web page is configured to generate launch request responsive to user interaction with the displayed web page after the web page has loaded. The launch request indicates the program to be launched (e.g., by indicating the custom protocol or otherwise indicating the program to be launched), as well as arguments for the launch. For example, the request may include a URI indicating the custom protocol associated with the server program and includes arguments to be passed to server program instance 630 when the instance is launched.

The launch request arguments can include a set of connection data to be used by web page 612 and server program instance 630 for establishing a connection. By way of example, but not limitation, the arguments may include a launch id and port number. The launch id, according to one embodiment, comprises any data that can be used to confirm that a connection request to server program instance 630 is from a web page that is permitted to connect to server program instance. For example, the launch id may be used to confirm that a connection request is from a web page that launched server program instance 630. The launch id may be a number, a string or other data. The port number indicates the port number on which a launched instance of the server program is to listen for connection requests.

The launch request may include a set of random connection data to be used by web page 612 and server program instance 630 for establishing a connection. According to one embodiment, web page 612 includes instructions executable to generate a random launch id and random port number to be included as arguments of the launch request. For example, web page 612 may include a random string generator function to cause browser 610 to generate a random launch id and a random number generator to cause browser 610 to generate a random port number. The random number generator for selecting the port may be configured to select a random port number in a range or to avoid ports used by commonly installed applications. As an example, the web page may be configured to generate a random port number in the range [10000,65535].

In one embodiment, the launch request includes a custom URI usable to launch server program instance 630. For example, the web page may be configured to compose a custom URI having the form myprotocol:port:launchid. Thus, if the launch id string is agdx3ofpmbs and the port is 23845, the web page can compose the URI myprotocol: 23845:agdx3ofpmbs. The web page can then use the custom URI to launch an instance of the server program (e.g., to launch instance 630).

The mechanism for a web page to launch a server program may be browser dependent. As one example, the web page can be executable to generate a statement such as:
    window.location.href=myprotocol:23845:agdx3ofpmbs;
which will cause certain browsers to request that the operating system launch an instance of the program associated with "myprotocol" and pass the arguments to the instance as command line arguments. As will be appreciated, the foregoing is provided by way of example and not limitation and the instructions for generating the launch request using the custom URI (or other launch request) can be configured as appropriate for the browser to which the page is served.

Responsive to receiving the launch request, operating system 602 determines that the server program is registered in its registry for "myprotocol" and launches server program instance 630, passing the arguments from the request to server program instance 630 (e.g., as command line arguments). The arguments passed to the server program instance may include a set of connection data to be used by server program instance 630 when establishing a connection with the web page. The set of connection data received by server program instance 630 from operating system 602 or otherwise received by the server program instance for use in establishing a connection with a page may be referred to as connection configuration data. The connection configuration data may include, for example, the port on which server program instance 630 is to listen for a connection request, a launch id, or other connection configuration data. As discussed above, the port may be dynamically selected by the web page. Even more particularly, the port may be randomly selected by the web page.

The web page includes instructions for establishing a connection, such as an application layer socket connection, with the launched server program instance 630. According to one embodiment, the connection is established in a different thread from the thread in which block 614 is executed or a different thread than the main web page thread.

For example, the web page may launch a web worker that includes instructions executable to connect to server program instance 630 as a client. The first thread (e.g., the main web page thread) and the web worker can communicate with each other asynchronously using web worker application program interfaces (API) (e.g., window.postMessage/window.onmessage javascript API). The first thread can be configured to pass the connection data (e.g., launchid and port) to the web worker.

The web worker is executable to create a connection with server program instance 630. The web worker is configured to compose a set of socket configuration information that is used to create a socket instance. For example, the web worker may compose a URI, such as a URL, that will be used to connect to server program instance 630. The URI may include a host name or address and a set of connection data, such as a port and launch id. For example, the web worker can be configured to compose the URI by inserting the port and launchid passed from the first thread into the URI ws://localhost:<port>/?launchid=<launchid>. Using the example connection data from above, the web worker can thus compose the URI:
    ws://localhost:23845/?launchId=agdx3ofpmbs.

The web worker uses the set of socket configuration information to create a client socket instance 622, which may be an object instance that represents an end-point for sending or receiving data. According to one embodiment, socket instance 622 is a WebSocket instance. The web worker 618 may use a WebSocket constructor to create the new WebSocket instance using the URL to which to connect. For example, the web worker can create socket instance 622 using the URL ws://localhost:23845/?launchId=agdx3ofpmbs. The web worker sends a connection request 624 to connect to server program instance 630, where the connection request 624 is in a format known to server program instance 630. The connection request may include the set of connection data. According to one embodiment, connection request 624 comprises an HTTP request (e.g., an HTTP GET request). Even more particularly, connection request 624 may comprise a WebSocket handshake, such as:
    GET ws://localhost:23845/?launchId=agdx3ofpmbs/ HTTP/1.1
    Origin: http://example.com
    Connection: Upgrade
    Host: localhost
    Upgrade: websocket If connection request 624 is accepted, the server program instance 630 may return an acceptance confirmation 625. If the acceptance confirmation is valid based on the communication protocol being used, a connection 626 can be considered established between the web worker and server program instance 630 and the state of the socket instance 622 can be updated to reflect that connection 626 is open. The web worker can be configured to notify the main web page thread (or other thread) that the socket connection 626 has been established. Other components of web page 630 (for example, scripts executing in the main web page thread or other thread) may pass data to the web worker and the web worker may communicate the data to instance 630 using socket instance 622. Similarly, the web worker can pass data received via connection 626 to other components.

Turning to server program instance 630, server program instance 630 is executable to receive a set of connection configuration data. According to one embodiment, server program instance 630 is configured to parse the command line arguments received from operating system 602 at launch to extract the connection configuration data. For example, server program instance 630 may parse the command line arguments to extract the port number and launch id. The port number indicates the port on which server program instance 630 is to listen for connection requests and the launch id is used to determine whether to allow or deny connection requests, as discussed below. A launch id received from the operating system 602 or otherwise received prior to a connection request and that is to be used as part of the decision whether to allow or deny a connection request can be referred to as a connection configuration launch id.

Server program instance 630 creates a server socket instance 633 according to a protocol (e.g., a server WebSocket instance), binds the server socket instance 633 to an address and listens on the server socket 633 for requests to connect. According to one embodiment, server program instance 630 binds server socket instance 633 to a port on the loopback address of computing device 600 (typically the IP address 127.0.0.1) or otherwise binds server socket instance 633 to the local host. For example, if the set of configuration data includes the port 23845, server program instance 630 can bind socket instance 633 to 127.0.0.1:23845.

Server program instance 630 is configured to listen using server socket instance 633 for connection requests on the port (e.g., 127.0.0.1:23845). When server program instance 630 receives a connection request, such as connection request 624, on the designated port, server program instance 630 parses the request 624 for connection data and compares connection data from the connection request (connection request connection data) with the connection data received at launch (the connection configuration data). According to one embodiment, server program instance 630 may be configured to parse a URL of the form "ws:// localhost<port>/?launchid=<launchid>" or otherwise parse information in a received connection request 624 to extract the launch id from the query string. The launch id extracted from the connection request can be referred to as a connection request launch id. Server program instance 630 compares the launch id extracted from the query string (the connection request launch id) to the launch id received in the command line arguments (the connection configuration launch id). Using the example set of connection data from above, server program instance 630 can parse connection request 624 to extract aagdx3ofpmbs from the query string and compare agdx3ofpmbs to the launch id passed by operating system 602.

If the connection data extracted from the connection request and the connection data received at launch do not match, server program instance 630 rejects the web socket connection attempt. For example, if the connection request launch and the connection configuration launch id received in the command line parameters do not match, server program instance 630 rejects the request. If the connection request data and connection configuration data match—for example if the connection request launch id and connection request launch id match—server program instance 630 sends the appropriate response to establish connection 626 (e.g., a WebSocket connection) between the web worker of the web page and server program instance 630 launched by the web page. At this point, the web page and server program instance 630 can exchange messages with each other via socket connection 626 established on behalf of the web page by the web worker, with server program instance 630 acting as a server.

The web page and server program may be configured to provide a wide degree of functionality depending on implementation. As just one example, the web page may be configured to provide a UI that allows a user to browse, select and view files stored on a remote server and the server program may be configured to download files and provide advanced content editing functionality. In this example, the web page may be configured to launch server program instance 630 based on user interaction with the rendered web page (for example selection of a file) and launch the web worker to connect to server program instance 630. When the main web page thread receives an indication that the connection between socket instance 622 and socket instance 633 is open, main web page thread can pass the selected file identification to the web worker via the web worker API and the web worker can pass the file identification to server program instances via connection 626. As server program instance 630 downloads the file, server program instance 630 can pass messages indicating the download progress of the file to the web worker via connection 626 and the web worker can pass the messages to the main web page thread via the web worker API. In this example, the web page may include user interface scripts executable to display the download progress in the display of the rendered web page. Server program instance 630 may provide its own UI, separate from the web page, with tools to allow a user to edit the file or perform other operations on the file.

In the prior examples, the port number on which server program instance 630 listens is a random port number. In other embodiments, the port number may be fixed. In such an implementation, the launch request 615 can include the fixed port number or omit the port number. If the fixed port number is the default port number for a protocol, the port number may be implied in connection request 624 based on the protocol used or specified in the connection request. The use of a fixed port may increase the likelihood of conflict with another service running on computing device 600. Moreover, in one embodiment, operating system 602 may be configured to launch server program instance 630 when a desktop login session begins with server program instance 630 configured to listen on a fixed port. Launching server program instance 630 at desktop login may result in a reduced user experience because, if the server program is not running for some reason, it may not be clear to the end user how to restart it in their desktop login session. The use of a fixed port number and launching server program instance login may result in a single instance of the server program serving multiple web pages, including web pages running in browsers in different desktop login sessions, all using the same port.

Further, in some embodiments, the web page can be configured to connect to server program instance 630 in the main web page thread. Establishing the connection using a second thread (e.g. for example using a web worker), however, can prevent the processing associated with establishing the connection from blocking execution of the main web page thread and, in particular, prevent blocking of UI scripts that are not dependent on establishing the connection.

Server program instance 630 may implement additional or alternative mechanisms to allow or deny connections. For example, server program instance 630 may allow or deny connections based on an origin. As will be appreciated, when a browser loads a JavaScript resource for a web page from a web site (typically but not necessarily the from the same web site that served the markup language file for the web page), the browser can remember the host associated with the JavaScript as the JavaScript's origin. Whenever a browser makes HTTP request using the XmlHttpRequest or fetch API or makes a WebSocket connection request using the WebSocket constructor, the browser can send an origin request header indicating the origin of the web site from which the JavaScript that is making the request was downloaded whenever this origin differs from that of the web page file (e.g., HTML file or other file) that caused the browser to load the JavaScript. That is, when the browser sends a cross-origin request, the browser includes the origin of the JavaScript that caused the request to be sent in an origin header of the cross-origin request. To prevent web scripts served from unwanted origins from launching and/or connecting to the server program, the server program can be configured with a whitelist of trusted origins. When a connection request is encountered with an unknown origin, the server program instance can either prompt the user and ask whether the origin should be trusted or reject the request if its origin is not in the whitelist. In addition or in the alternative, the server program may be provided with a blacklist of origins such that server program instance 630 denies connection requests containing blacklisted origins.

Further, while embodiment of FIG. 6 illustrates a web browser 610 rendering a web page, this is merely illustrative. Other embodiments of a computing device may comprise other types of page processing code, such as mobile applications or other applications configured to process pages. A page can be provided to the page processing code, where the page is processable by the page processing code to launch and connect to a server program instance as described herein.

In one embodiment, a computing device a server program is registered with the operating system of a computing device as a protocol handler for a protocol. For instance, "myprogram" may be registered with the operating system as the handler for "myprotocol." This registration may be performed by the installer code for the server program when the server program is installed. The operating system may then receive a request to launch the server program and an associated set of connection data, such as launch id and port number. For example, the operating system may receive a request referencing a protocol for which the server program is registered to handle. The operating system then launches an instance of the server program responsive to the launch request and passes the instance the associated set of connection data as, for example, command line arguments. The operating system may therefore launch the server program instance and pass arguments received in a launch request to the server program instance as connection configuration data. According to one embodiment, these steps are repeated to launch each instance of an installed server program.

Figure 7:
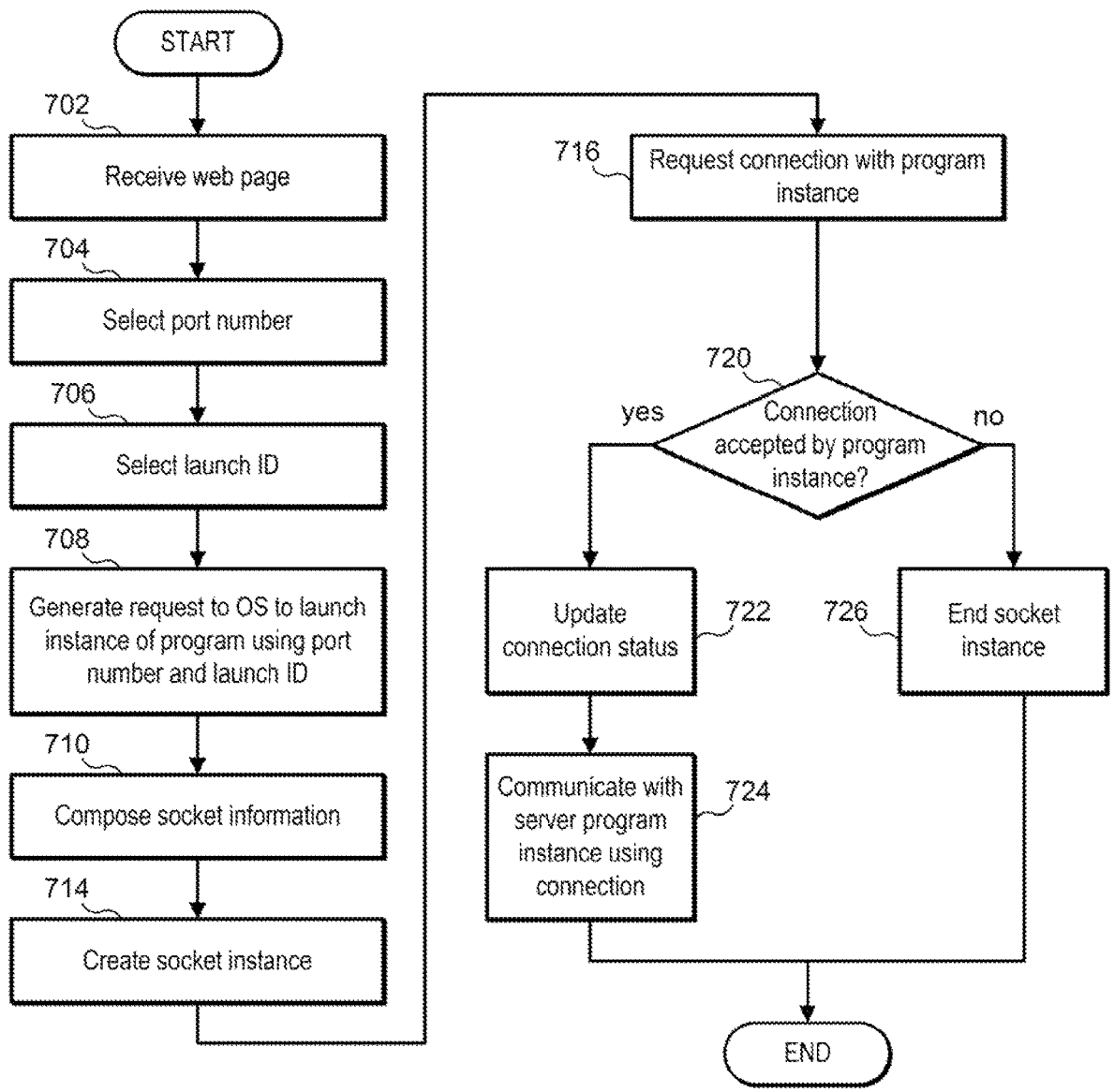
FIG. 7 is a flow chart illustrating a client-side method for launching and connecting to a server program instance in accordance with some embodiments.

FIG. 7 is a flow chart illustrating one embodiment of a client-side method for launching and connecting to a server program instance. In some embodiments, this method may be implemented by page processing code processing a page. For example, it may be implemented by a web browser processing a web page. Some steps may be performed by the page; i.e., through interpretation or execution of instructions of the page by the page processing code. In various embodiments, one or more of the steps may be performed in a thread that is independent of a main thread that is rendering the page. For example, one or more steps may be performed by a web worker that executes in a different thread than a main web page thread of a browser that is rendering a web page.

At step 702, page processing code receives and begins rendering of a page. For example, web browser 610 receives and renders web page 612. Receiving and rendering the page may include, for example, receiving and processing an initial page file, such as a file containing markup language (e.g., HTML) and, in some cases, embedded scripts, and receiving and processing resources referenced in the initial page file, such as style sheets, scripts, images, videos. The page being rendered can be configured to launch and connect to an instance of a server program (e.g., program server instance 630).

According to one embodiment, the page selects a set of connection data for connecting to an instance of a server program. For example, at step 704, the page is executed to select a port number and, at step 706, to select a launch id. As discussed above, the port number and launch id may be randomly generated.

At step 708, the page is executed to generate a request (e.g., launch request 615) to the operating system of the computing device to launch an instance of the server program. For example, the page may be configured to compose a custom URI having the form myprotocol:port:launchId and use the custom URI to launch an instance of the server program (e.g., to launch instance 630).

At step 710, the page is executed to compose a set of socket information that is used in creating a socket instance (socket) as an endpoint for communicating with the server program instance. According to one embodiment, the page is configured to compose a URI, such as a URL, that will be used to connect to server program instance 630. The URI may include a host name or address and a set of connection data (connection request connection data), such as a port and launch id. For example, the URI may be composed by inserting the port number and launch id into the URI ws://localhost<port>/?launchid=<launchid>. Using the example connection data from above, the page can compose the URI: ws://localhost:23845/?launchId=agdx3ofpmbs.

At step 714, the page is executed to create a client socket instance, such as client socket instance 622, representing an endpoint for communicating with the server program instance. As will be appreciated, the client socket instance may be an object that represents an end-point for sending or receiving data. According to one embodiment, a WebSocket constructor is used create a new WebSocket instance using the URL to which to connect. For example, a WebSocket constructor may be used to create a new WebSocket instance using the URL ws://localhost:23845/?launchId=agdx3ofpmbs.

At step 716, a connection request, such as connection request 624, is sent by the page to the server program instance using the client socket instance, where the connection request is in a format known to server program instance 630. According to one embodiment, the connection request may be an HTTP request. Even more particularly, the connection request may comprise a WebSocket handshake.

At step 720, a determination is made if the connection request was accepted by the server program instance. For example, it is determined if the server program instance returned an appropriate response indicating that the connection is accepted. If the connection was accepted the connection can be considered established and the page completes the connection from the client side. For example, the client socket instance can be updated, at 722, to represent that the socket instance is connected (e.g., that the connection is open). At step 724, the page and server program instance can communicate using the connection between the client socket instance and the server socket instance. The connection may be a persistent connection that remains open until terminated by the page or server program instance. If the connection request is not accepted (as determined at step 720), the client socket instance is terminated (step 726).

As indicated above, one or more steps of FIG. 7, may be implemented in a different thread from the main thread rendering the page. According to one embodiment, the page can be executed to launch a second thread in which code to perform one or more steps is executed. More particularly, a page can be executed to launch a web worker and pass the set of connection data to the web worker. One or more of steps step 710, 714, 716, 720, 722, 724 or other steps may be performed by the web worker. According to one embodiment, the web worker continues to execute until the client socket instance is terminated.

Figure 8:
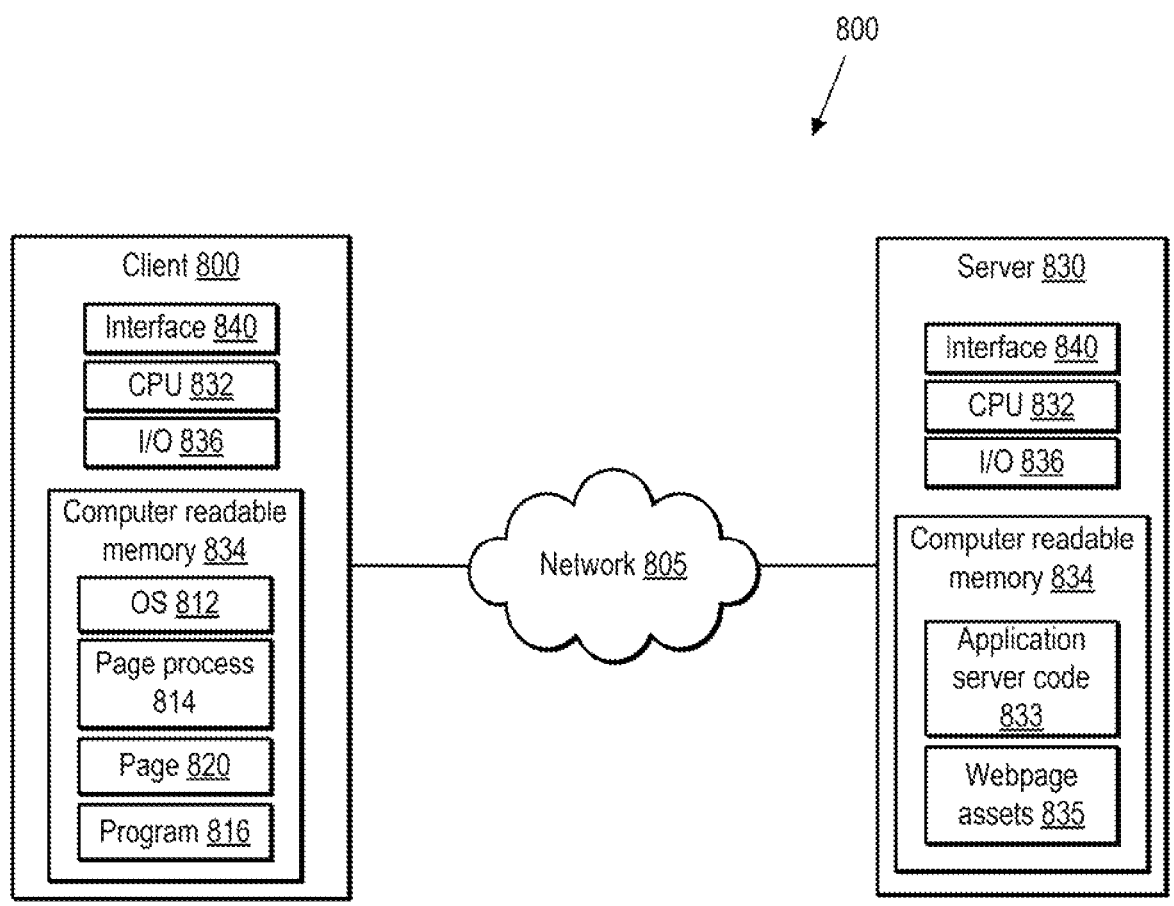
FIG. 8 is a diagrammatic representation of a distributed network computing environment in which some embodiments can be implemented.

Embodiments of the technology may be implemented on a computing system. Any combination of mobile desktop, server machine, embedded or other types of hardware may be used. FIG. 8 is a diagrammatic representation of one embodiment of a distributed network computing environment where embodiments disclosed herein can be implemented. The computing environment includes a client computer system 800 and a server computer system 830 connected to a network 805 (e.g., a local area network (LAN), a wide area network (WAN) such as the Internet, mobile network, or other type of network or combination thereof). Network 805 may represent a combination of wired and wireless networks that network computing environment may utilize for various types of network communications. Client computer system 800 may be an example of a computing device 600 of FIG. 6.

Client computer system 800 may include, for example, a computer processor 802 and associated memory 804. Computer processor 802 may be an integrated circuit for processing instructions, such as, but not limited to a CPU. For example, processor 802 may comprise one or more cores or micro-cores of a processor. Memory 804 may include volatile memory, non-volatile memory, semi-volatile memory or a combination thereof. Memory 804, for example, may include RAM, ROM, flash memory, a hard disk drive, a solid-state drive, an optical storage medium (e.g., CD-ROM), or other computer readable memory or combination thereof. Memory 804 may implement a storage hierarchy that includes cache memory, primary memory or secondary memory. In some embodiments, memory 804 may include storage space on a data storage array. Client computer system 800 may also include input/output ("I/O") devices 806, such as a keyboard, monitor, printer, electronic pointing device (e.g., mouse, trackball, stylus, etc.), or the like. Client computer system 800 may also include a communication interface 808, such as a network interface card, to interface with network 805.

Memory 804 may store instructions executable by processor 802. For example, memory 804 may include an operating system 812, a page processing program 814 (e.g., a web browser or other program capable of rendering pages) and a server program 816 configured to extend the functionality of page processing program 814. Further, memory may be configured with a page 820 processable (e.g., capable of being rendered by) by page processing program 814. Page 820 may be the local representation of a page, such as a web page, retrieved from the network environment. As will be appreciated, during rendering the page 820, page processing program 814 may request related resources, such as style sheets, image files, video files, audio files and other related resources as the page is being rendered and thus, code and other resources of the page may be added to the page as it is being rendered.

Server computer system 830 may include, for example, a computer processor 832 and associated memory 834. Computer processor 832 may be an integrated circuit for processing instructions. For example, processor 832 may comprise one or more cores or micro-cores of a processor. Processor 832 may comprise a CPU. Memory 834 may include volatile memory, non-volatile memory, semi-volatile memory or a combination thereof. Memory 834, for example, may include RAM, ROM, flash memory, a hard disk drive, a solid state drive, an optical storage medium (e.g., CD-ROM), or other computer readable memory or combination thereof. Memory 834 may implement a storage hierarchy that includes cache memory, primary memory or secondary memory. In some embodiments, memory 834 may include storage space on a data storage array. Server computer system 830 may also include I/O devices 836. Server computer system 830 may also include a communication interface 840, such as a network interface card, to interface with network 805.

Memory 834 may store instructions executable by processor 832. For example, memory 834 may include an operating system and application server code 833. Application server code 833 can be executable to receive requests from client computers, such as client computer system 800, generate or server page files from a set of page assets 835 (e.g., complete web pages, page fragments, scripts or other assets) and return page files in response. A page file may reference additional resources, such as style sheets, images, videos, audio, scripts or other resources at server computer system 830 or at other network locations, such as at additional server systems.

According to one embodiment, the network environment may be configured with a page such as a web page which is configured to launch and connect to an instance of server program 816. The page may include a page file containing page code (HTML or other markup language, scripts or code), stored or generated by server computer system 830, that references resources at server computer system 830 or other network locations, such as additional server computer systems. The page file or related resources may include scripts or other code executable to launch and connect to an instance of server program 816.

Those skilled in the relevant art will appreciate that the embodiments can be implemented or practiced in a variety of computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, stored as firmware in chips, as well as distributed electronically over the Internet or over other networks (including wireless networks). Example chips may include Electrically Erasable Programmable Read-Only Memory (EEPROM) chips.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. Steps, operations, methods, routines or portions thereof described herein be implemented using a variety of hardware, such as CPUs, application specific integrated circuits, programmable logic devices, field programmable gate arrays, optical, chemical, biological, quantum or nanoengineered systems, or other mechanisms.

Software instructions in the form of computer-readable program code may be stored, in whole or in part, temporarily or permanently, on a non-transitory computer readable medium. The computer-readable program code can be operated on by a processor to perform steps, operations, methods, routines or portions thereof described herein. A "computer-readable medium" is a medium capable of storing data in a format readable by a computer and can include any type of data storage medium that can be read by a processor. Examples of non-transitory computer-readable media can include, but are not limited to, volatile and non-volatile computer memories, such as RAM, ROM, hard drives, solid state drives, data cartridges, magnetic tapes, floppy diskettes, flash memory drives, optical data storage devices, compact-disc read-only memories. In some embodiments, computer-readable instructions or data may reside in a data array, such as a direct attach array or other array. The computer-readable instructions may be executable by a processor to implement embodiments of the technology or portions thereof.

A "processor" includes any, hardware system, hardware mechanism or hardware component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

Different programming techniques can be employed such as procedural or object oriented. Any suitable programming language can be used to implement the routines, methods or programs of embodiments of the invention described herein, including R, Python, C, C++, Java, JavaScript, HTML, or any other programming or scripting code, etc. Communications between computers implementing embodiments can be accomplished using any electronic, optical, radio frequency signals, or other suitable methods and tools of communication in compliance with known network protocols.

Any particular routine can execute on a single computer processing device or multiple computer processing devices, a single computer processor or multiple computer processors. Data may be stored in a single storage medium or distributed through multiple storage mediums.

Although the steps, operations, or computations may be presented in a specific order, this order may be changed in different embodiments. In some embodiments, some steps may be omitted. Further, in some embodiments, additional or alternative steps may be performed. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Thus, while the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A method comprising:
loading, in a web browser executing on a client device, an interface to a first server external to the client device;
launching, on the client device, a first local server program instance that communicates with the interface to the first server through an application of the client device, the first local server program instance designating a storage location that is local to the client device;
launching, on the client device, a second local server program instance that communicates with a client program configured to access a second server external to the client device, wherein the application of the client device does not include the client program, wherein the application of the client device is prevented from directly accessing the second server;
responsive to a user request from the web browser to access data stored on the second server, accessing a URL associated with the client program, wherein the URL identifies the storage location that is local to the client device;
the client program accessing the second server and providing the requested data to the second local server program instance;
the second local server program instance transferring the requested data to the storage location that is local to the client device; and
responsive to the second local server program instance transferring the requested data to the storage location that is local to the client device, the first local server program instance accessing the requested data stored by the second local server program instance in the storage location that is local to the client device and providing the requested data via the application of the client device to the web browser executing on the client device.

2. The method of claim 1, wherein the client program is launched by accessing the URL.

3. The method of claim 1, wherein the storage location that is local to the client device comprises a folder on a storage device, wherein the folder is associated with a specific user of the web browser, and wherein the URL identifies the folder associated with the specific user.

4. The method of claim 1, wherein the client program is configured to freeze the interface to the first server prior to opening an interface to the second server.

5. The method of claim 1, further comprising the web browser obtaining a user token for the second server, wherein the user token is associated with a specific user of the client device, and wherein the user token is included in the URL.

6. The method of claim 1, wherein launching the first local server program instance comprises:
generating a first set of connection data usable by the first local server program instance to verify that a connection request is from a web page that is permitted to connect to the first local server program instance;
providing the first set of connection data to the first local server program instance; and
establishing a connection between the web page and the first local server program instance which is verified based on the first set of connection data and is usable for bi-directional communication between the web page and the first local server program instance.

7. The method of claim 1, wherein the first server comprises a web page server, wherein the second server comprises a document server, and wherein the requested data comprises one or more documents that are stored on the document server.

8. The method of claim 1, further comprising executing a first software application on the client device, wherein the interface to the first server is implemented in an add-in to the first software application, wherein the first server is directly accessible by the first software application through the interface and wherein the second server is not directly accessible by the first software application.

9. A system comprising:
a client device having a processor configured to:
load, in a web browser executing on the client device, an interface to a first server external to the client device;
launch a first local server program instance that communicates with the interface to the first server through an application of the client device;
designate, by the first local server program instance, a storage location that is local to the client device;
launch a second local server program instance that communicates with a client program configured to access a second server external to the client device, wherein the application of the client device does not include the client program, wherein the application of the client device is prevented from directly accessing the second server;

access, responsive to a user request from the web browser to access data stored on the second server, a URL associated with the client program, wherein the URL identifies the designated storage location that is local to the client device;

access, through the client program, the second server;

receive, through the client program, the requested data and provide the requested data to the second local server program instance;

transfer, by the second local server program instance, the requested data to the storage location that is local to the client device; and responsive to the second local server program instance transferring the requested data to the storage location that is local to the client device, access, by the first local server program instance, the requested data stored by the second local server program instance in the storage location that is local to the client device and provide the requested data via the application of the client device to the web browser executing on the client device.

10. The system of claim 9, wherein the client program is launched by accessing the URL.

11. The system of claim 9, wherein the storage location that is local to the client device comprises a folder on a storage device, wherein the folder is associated with a specific user of the web browser, and wherein the URL identifies the folder associated with the specific user.

12. The system of claim 9, wherein the processor is configured to freeze the interface to the first server prior to opening an interface to the second server.

13. The system of claim 9, wherein the processor is further configured to cause the web browser to obtain a user token for the second server, wherein the user token is associated with a specific user of the client device, and wherein the user token is included in the URL.

14. The system of claim 9, wherein launching the first local server program instance comprises:

generating a first set of connection data usable by the first local server program instance to verify that a connection request is from a web page that is permitted to connect to the first local server program instance;

providing the first set of connection data to the first local server program instance; and establishing a connection between the web page and the first local server program instance which is verified based on the first set of connection data and is usable for bi-directional communication between the web page and the first local server program instance.

15. The system of claim 9, wherein the first server comprises a web page server, wherein the second server comprises a document server, and wherein the requested data comprises one or more documents that are stored on the document server.

16. The system of claim 9, further comprising executing a first software application on the client device, wherein the interface to the first server is implemented in an add-in to the first software application, wherein the first server is directly accessible by the first software application through the add-in interface and wherein the second server is not directly accessible by the first software application.

17. A computer program product comprising a non-transitory computer-readable medium storing instructions executable by one or more processors to perform:

loading, in a web browser executing on a client device, an interface to a first server external to the client device;

launching, on the client device, a first local server program instance that communicates with the interface to the first server through an application of the client device, the first local server program instance designating a storage location that is local to the client device;

launching, on the client device, a second local server program instance that communicates with a client program configured to access a second server external to the client device, wherein the application of the client device does not include the client program, wherein the application of the client device is prevented from directly accessing the second server;

responsive to a user request from the web browser to access data stored on the second server, accessing a URL associated with the client program, wherein the URL identifies the storage location that is local to the client device;

the client program accessing the second server and providing the requested data to the second local server program instance;

the second local server program instance transferring the requested data to the storage location that is local to the client device; and responsive to the second local server program instance transferring the requested data to the storage location that is local to the client device, the first local server program instance accessing the requested data stored by the second local server program instance in the storage location that is local to the client device and providing the requested data via the application of the client device to the web browser executing on the client device.

18. The computer program product of claim 17, wherein the instructions are further executable to perform:

generating a first set of connection data usable by the first local server program instance to verify that a connection request is from a web page permitted to connect to the first local server program instance;

providing the first set of connection data to the first local server program instance; and establishing a connection between the web page and the first local server program instance which is verified based on the first set of connection data and is usable for bi-directional communication between the web page and the first local server program instance.

19. The computer program product of claim 17, wherein the client program is launched by accessing the URL.

20. The computer program product of claim 17, wherein the instructions are further executable to cause the web browser to obtain a user token for the second server, wherein the user token is associated with a specific user of the client device, and wherein the user token is included in the URL.

* * * * *